Jan. 26, 1943.   J. H. CADDELL   2,309,497
OIL GAUGE
Filed May 5, 1941   2 Sheets-Sheet 1
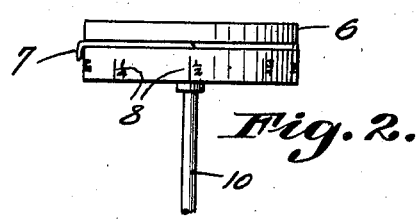
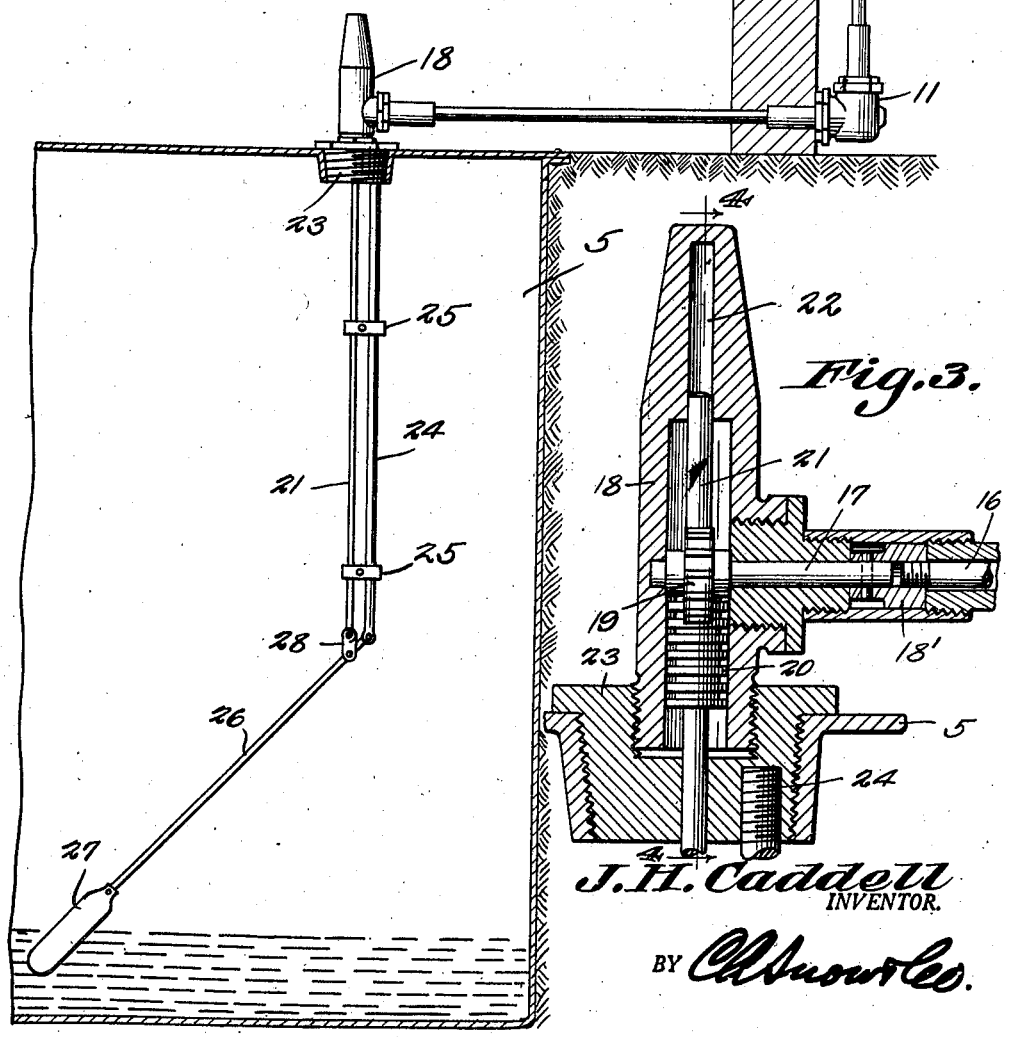
J. H. Caddell
INVENTOR.
BY

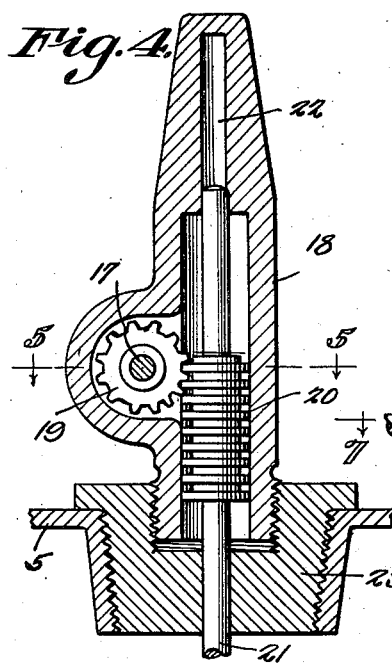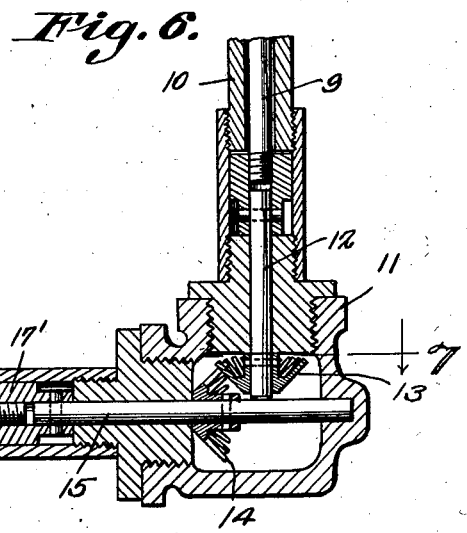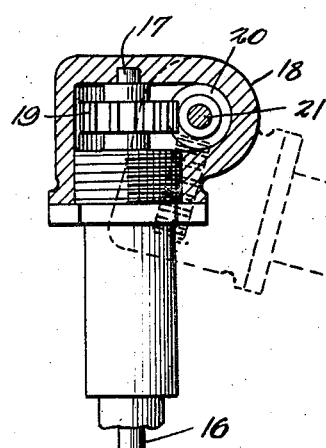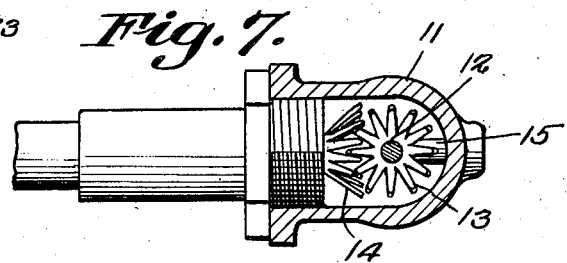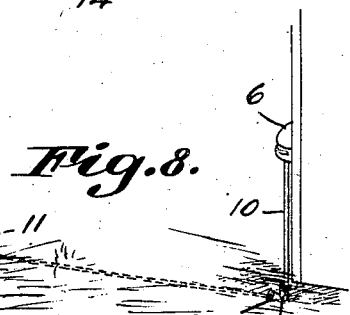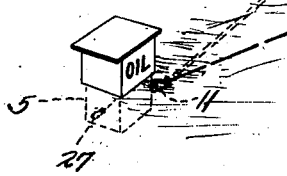

Patented Jan. 26, 1943

2,309,497

UNITED STATES PATENT OFFICE 2,309,497

OIL GAUGE

James H. Caddell, Richmond, Va.

Application May 5, 1941, Serial No. 391,960

2 Claims. (Cl. 73—317)

This invention relates to gauges designed primarily for use in indicating the oil level in fuel oil tanks.

The primary object of the invention is to provide mechanical means for operating an indicator located remote from the tank containing the liquid measured.

An important object of the invention is the provision of a union or coupling for connecting the shaft sections of the gauge, which will permit of the universal adjustment of one section with respect to another, thereby providing connecting means between the sections of the shafts of the gauge which will permit of the installation of the shafts in obscure locations, as for example around trees, posts, buildings or the like obstructions, which would prevent the laying of the shafts in a direct line between the supply tank and indicator of the gauge.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a diagrammatic view illustrating a tank equipped with an indicator constructed in accordance with the invention, the indicator being positioned adjacent to the wall of a building.

Figure 2 is an elevational view of the indicator of the gauge.

Figure 3 is a longitudinal sectional view through the coupling mounted on the top of the supply tank.

Figure 4 is a view taken at right angles to Figure 3.

Figure 5 is a sectional view taken on line 5—5 of Figure 4, illustrating one of the shafts as in an adjusted position, in dotted lines.

Figure 6 is a longitudinal sectional view illustrating the connection between adjacent shafts, whereby movement of one shaft is transmitted to the other.

Figure 7 is a sectional view taken on line 7—7 of Figure 6.

Figure 8 is a diagrammatic view, illustrating the shafting of the gauge as extended around a tree.

Referring to the drawings in detail, the reference character 5 designates the oil fuel supply tank, with which the gauge is used, and which is usually located at a point remote from the indicator of the gauge, which in the present instance is indicated by the reference character 6. While the indicator in the present showing, embodies an indicating hand indicated at 7, the indicating hand operating in a horizontal plane over a graduated member 8, it is to be understood that the type of indicator may be varied, to meet various requirements.

The indicating hand 7 is mounted at the upper end of the shaft 9 mounted in the tube 10 that rises from the union 11, the shaft 9 receiving motion from the shaft 12 which carries the pinion 13 at its lower end. The pinion 13 meshes with the pinion 14 secured to the shaft 15, at a point within the union 11, as clearly shown by Figure 6. The shaft 15 is connected with the shaft 16 through the coupling 17'. One end of the shaft 16 connects with the shaft 17, by means of the coupling 18'. Secured to the shaft 17, and arranged within the housing 18, is a pinion 19 that meshes with the annular teeth 20 formed on the vertical shaft 21, at a point below the upper end of the shaft. The upper end of the shaft moves in the bore 22 and is guided in its movements, to the end that true operation of the shaft 21, is insured at all times.

The housing 18 is supported by the plug 23 that is threaded in an opening of the tank. The plug 23 affords means whereby the shafts 16 and 17 may be supported. Secured to the plug 23, and extended downwardly therefrom an appreciable distance, is a supporting rod 24 to which the bearing members 25 are connected, the bearing members 25 providing supports for the shaft 21, which is shown as operating through the bearing members 25. Pivotally connected with the lower end of the supporting rod 24, is the float rod 26 whch carries the float 27 at its free end, the float resting on the surface of the oil contained in the tank 5. The lower end of the shaft 21 has pivotal connection with the float rod 26, through the pivoted links 28 to the end that movement of the rod 26, due to the rise and fall of the float 27 on the liquid level in the tank, will move the shaft 21 vertically transmitting movement to the shaft 17, through the pinion 19. The shaft 17 transmits rotary movement to the shaft 16, which in turn rotates the shaft 9, transmitting movement to the indicator hand 7.

From the foregoing it will be seen that due to the construction of the annular teeth 20, the housing 18 may be rotated in a horizontal plane around the shaft 21, thereby adapting the device for installation in restricted places, or around buildings, trees or the like. Due to this construction, it is unnecessary to rearrange the unions of the device, cut or in any way alter the construction of the various shafts of the device, in order to install the device.

What is claimed is:

1. A liquid level gauge for tanks, comprising a fitting including a plug adapted to be positioned in an opening of a tank, said plug having a bore and having a threaded opening, an elongated housing having a threaded end fitted in the threaded opening, said housing being rotatably adjustable with respect to the axis of the tank in which the plug is positioned, said housing having a lateral opening, a supporting rod depending from the plug, bearing members on the supporting rod, an operating shaft movable through the bearing and extending into the housing, horizontally formed annular teeth on the operating shaft and disposed within the housing, a horizontal shaft, a pinion on one end of the horizontal shaft, extending tthrough the lateral opening, said pinion adapted to mesh with the annular teeth of the operating shaft, whereby vertical movement of the operating shaft operates to rotate the horizontal shaft, a float-actuated rod pivotally connected with the operating shaft, and indicating means operated by said horizontal shaft.

2. A liquid level gauge for tanks, comprising a fitting including a plug adapted to be positioned in an opening of a tank, said plug having a vertical bore, an elongated housing fitted in the plug and rising above the plug, said housing having an enlarged bore and a substantially small bore forming a continuation of the enlarged bore, an operating shaft extending through the vertical bore of the plug, the upper end of the shaft operating in the substantially small bore and engaging the wall thereof, annular horizontally formed gear teeth on the shaft, said gear teeth being of a diameter to engage the wall of the enlarged bore, a horizontal shaft extending into the housing, a pinion on the latter shaft, said pinion adapted to mesh with said annular teeth, whereby vertical movement of the operating shaft produces a rotary movement of the horizontal shaft, indicating means operated by the horizontal shaft, and float-controlled means in the tank adapted to move the operating shaft vertically.

JAMES H. CADDELL.